A. RIGDA.
SLED.
APPLICATION FILED MAR. 19, 1919.

1,316,596.

Patented Sept. 23, 1919.

Andrew Rigda
INVENTOR
BY
Geo. B. Willcox ATTORNEY

UNITED STATES PATENT OFFICE.

ANDREW RIGDA, OF BRIDGEPORT, MICHIGAN.

SLED.

1,316,596.

Specification of Letters Patent.   Patented Sept. 23, 1919.

Application filed March 19, 1919.   Serial No. 283,449.

*To all whom it may concern:*

Be it known that I, ANDREW RIGDA, a citizen of the United States, residing at Bridgeport, in the county of Saginaw and State of Michigan, have invented certain new and useful Improvements in Sleds; and I do hereby declare the following to be a full, clear, and exact description of the invention, such as will enable others skilled in the art to which it appertains to make and use the same.

This invention relates to mechanically propelled sleds and pertains more particularly to that class of mechanically propelled sleds adapted to be actuated by hand and steered by the rider and the present improvement relates more specifically to certain improved means and devices whereby I am enabled to produce a sled of simple, yet strong construction capable of being easily steered and adapted to be adjusted to suit the stature of either tall or short riders.

With these and certain other objects in view, which will appear later in the specification, my invention consists in the devices described and claimed and the equivalents thereof.

In the drawings, Figure 1 is a top plan view of a sled, various lateral adjusted positions of the steering runner being indicated by dotted lines.

Figure 1:
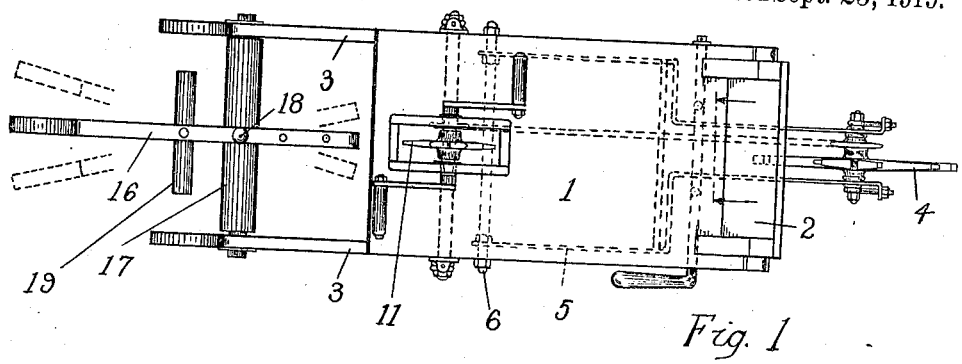
Figure 2:
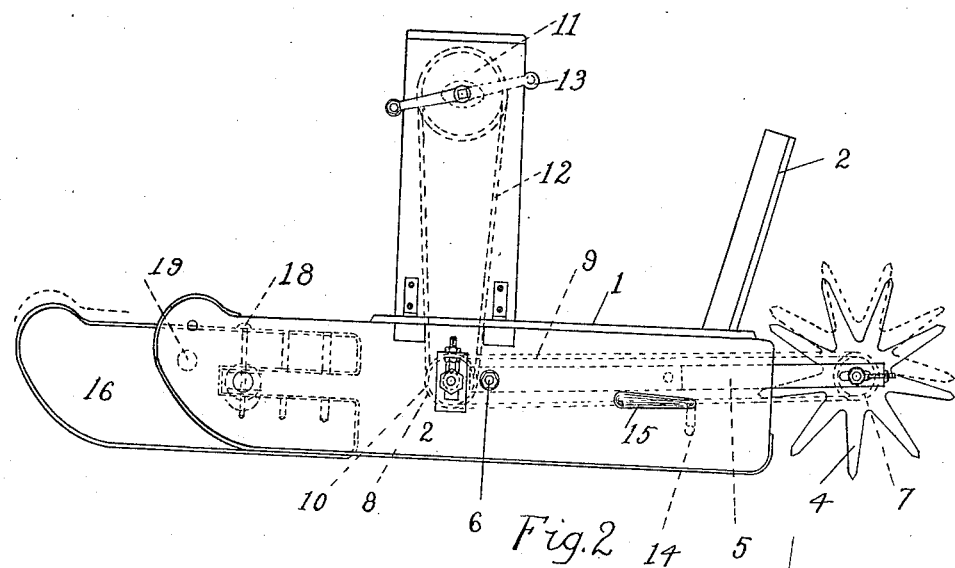
Fig. 2 is a side elevation indicating by dotted lines the vertical movement of the front end of the runner and the raised position of the propelling wheel.
Figure 3:
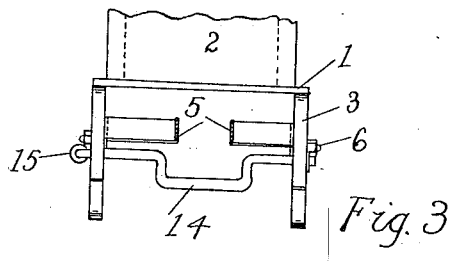
Fig. 3 is a rear view of the sled broken away in part, showing the means by which the frame of the propelling wheel may be lifted.

As is clearly shown in the drawings, the device consists in a platform 1, which forms the seat the back of which is indicated by the numeral 2, and the runners 3.

The propelling device consists in a propelling wheel 4 of suitable size and shape, mounted in a frame 5, which is pivoted at 6 to the runners and which carries a pair of sprockets 7, 8 and chain 9. A second pair of sprockets 10 and 11 carry a chain 12. A crank 13 is secured to the upper sprocket 11 by which the propelling wheel 4 is revolved.

The propelling wheel may be lifted clear of the ground when desired, by means of a crank or bent rod 14 which is mounted on the runners and which can be conveniently actuated by a projecting handle 15 within easy reach of the rider.

My improved steering device consists in a centrally disposed forwardly projecting runner 16 mounted on a trunnion 17 which is pivoted to the pair of runners 3, 3. The trunnion 17 receives the slotted rear end of the runner 16, the runner being secured to the trunnion by means of a pin 18, which passes vertically through the runner and through a hole in the trunnion 17, thereby permitting the runner 16 to have a sidewise movement, as indicated in Fig. 1 for steering.

The runner 16 is controlled by the feet of the operator which rest on a pair of laterally projecting lugs 19.

When a taller person is riding, the pin 18 can be removed and the runner 16 extended forward, the pin being then replaced in the next hole of the runner, thus extending the distance between the seat and the foot lugs 19.

Having thus described my invention, what I claim and desire to secure by Letters Patent is:

In combination, a sled comprising a platform, a seat and a pair of runners, a hand-actuated propelling device, a trunnion pivotally mounted between said runners near their forward ends, said trunnion formed with a vertical opening, a centrally disposed steering runner on said trunnion, steering lugs on said runner, said runner formed with a longitudinal slot and a plurality of vertical openings, a pin received in the opening of said trunnion and in any one of the openings of said runner whereby to vary the distance between said seat and said steering lugs.

In testimony whereof, I affix my signature.

ANDREW RIGDA.

Copies of this patent may be obtained for five cents each, by addressing the "Commissioner of Patents, Washington, D. C."